United States Patent [19]

Rutledge, Sr. et al.

[11] Patent Number: 5,039,365
[45] Date of Patent: Aug. 13, 1991

[54] METHOD FOR ENCAPSULATING AND BARRIER CONTAINMENT OF ASBESTOS FIBERS IN EXISTING BUILDING STRUCTURES

[75] Inventors: William W. Rutledge, Sr., Greenville; Henry Levy, Taylors; John L. Cousins, Greenville, all of S.C.

[73] Assignee: Wall & Floor Treatments, Inc., Liberty, S.C.

[21] Appl. No.: 407,130

[22] Filed: Sep. 14, 1989

[51] Int. Cl.$^5$ .............................................. E04B 2/00
[52] U.S. Cl. ...................... 156/71; 52/309.3; 52/309.17; 52/515; 52/516; 52/746; 156/280; 156/310; 428/443
[58] Field of Search .................. 156/71, 280, 310; 52/746, 309.3, 309.17, 515, 516; 428/443

[56] References Cited

U.S. PATENT DOCUMENTS

| | | | |
|---|---|---|---|
| 1,850,787 | 3/1932 | Brisinger . | |
| 3,044,919 | 7/1962 | Stoneburner | 156/71 |
| 3,185,297 | 5/1965 | Rutledge | 206/59 |
| 3,580,777 | 5/1971 | Hartzell et al. | 428/443 |
| 3,887,748 | 6/1975 | Swedenberg et al. | 428/247 |
| 3,941,632 | 3/1976 | Swedenberg et al. | 156/71 |
| 4,309,477 | 1/1982 | Pezzoli | 428/378 |
| 4,328,197 | 5/1982 | Flowers | 423/327 |
| 4,828,883 | 5/1989 | Ramun | 428/443 |

OTHER PUBLICATIONS

"Flexi-Wall Plaster in a Roll", Technical Bulletin, Wall & Floor Treatments, Inc., Liberty, SC, 1987.

Primary Examiner—John J. Gallagher
Attorney, Agent, or Firm—Dority & Manning

[57] ABSTRACT

A method of encapsulating and providing barrier containment for asbestos which forms an integral part of existing building structures includes applying an encapsulating coating comprising a water soluble polyvinyl acetate emulsion to the exterior surface of the structure. The encapsulating coating is dried to permit maximum penetration and encapsulation prior to performing subsequent steps which may disturb the asbestos fibers in the surface of the building structure. A primer coating comprising a stronger formulation of polyvinyl acetate emulsion is applied to the structure surface. An adhesive coating comprising the stronger formulation of the polyvinyl acetate emulsion is applied to the gypsum side of a sheet of a surface covering product that comprises a substantially dry, semi-hydrated gypsum. The sheet of gypsum product is applied to the surface of the structure by contacting the primer and adhesive coatings with one another. This procedure is repeated until all of the surface of the structure is covered. Each subsequent sheet of gypsum product is applied so as to overlap by about two inches the edge of the prior sheet of gypsum product. A preliminary sealant coating is provided for the exposed surface of the gypsum product and allowed to dry. A vapor barrier coating comprising a water-based acrylic emulsion is applied to the preliminary sealant coating and allowed to dry. A final coating comprising the water-based acrylic emulsion is applied over the vapor barrier coating.

20 Claims, 2 Drawing Sheets

METHOD FOR ENCAPSULATING AND BARRIER CONTAINMENT OF ASBESTOS FIBERS IN EXISTING BUILDING STRUCTURES

BACKGROUND OF THE INVENTION

The present invention relates to an improved method for controlling/asbestos fibers in existing building structures and more particularly to a method for encapsulating and containing the asbestos fibers in existing building structures.

Asbestos present in the walls and ceilings and other existing building structures, such as pipes, ducts, boilers, etc., and insulation surrounding same, constitutes a serious threat to the health of the users of such buildings, which include hospitals, schools, and other public and private accommodations. Airborne asbestos fibers can enter the body and cause asbestois, lung cancer, mesothelioma, and other cancers. Asbestos in buildings can be found on ceilings, walls, and in insulation surrounding hot or cold pipes, ducts, boilers, tanks, and in other asbestos containing materials (ACM). The asbestos can be sprayed onto a surface, troweled onto a surface, or constitute an integral part of the material which is formed into the structure such as ceiling tiles, floor tiles, wall boards, etc. Asbestos that can be crumbled or pulverized with simple hand pressure is considered to be friable and has the greatest potential of becoming airborne asbestos, to which is attributed the health dangers such as mentioned above.

Treatments such as those found in U.S. Pat. No. 4,328,197 to Flowers are applied to the asbestos fibers prior to their incorporation into the types of asbestos products or applications mentioned above. U.S. Pat. No. 4,309,477 to Pezzoli employs a technique that includes spraying an ionizable salt solution onto the asbestos and preferably contacting the asbestos with the ionizable salt solution by slurrying the asbestos in same for a sufficient time to allow the surface of the asbestos to be contacted and wetted by the solution. Thus, Flowers and Pezzoli do not address the problem of dealing with asbestos already contained in existing building structures. Moreover, treatments like these are designed to reduce the level of irritation that the treated asbestos fibers pose to living cells relative to that posed by the untreated asbestos fibers. Such treatments do not necessarily prevent the formation of airborne asbestos fibers.

Actions aimed at correcting or abating the problem of airborne asbestos fibers include removal of the structures containing the asbestos, encapsulation of such structures, or containment of such structures by barrier means.

Removing the asbestos structures is always expensive, involves more exposure to the workers doing the removal, and is not a practical method of abatement for many buildings in which the asbestos forms an integral part of load bearing structures for example. Moreover, the Environmental Protection Agency closely regulates the activities of contractors who perform the removal. The EPA levies fines in excess of $250,000 for violations of federal rules aimed at preventing cancercausing asbestos fibers from being released into the air.

The encapsulation method involves spraying the asbestos material with a sealant to bond the fibers together so as to prevent them from delaminating from the structure and becoming airborne. However, encapsulation typically gives little or limited protection at best from impact with the asbestos structure. Encapsulation is not always effective to prevent the asbestos fibers from delaminating from the substrate and becoming airborne. U.S. Pat. No. 1,850,787 to Brisinqer involves covering wall boards formed of a fibrous composition. The wall boards are completely covered with sheets of fabric, and a thin coat of plastic material is applied to the fabric to provide a finishing surface. The finishing coat is made of an elastic and tough but not brittle material, and a bond is actually formed between the finishing coat and the fabric so that cracks are eliminated regardless of the ordinary distortion of the walls caused by settling of the building, vibration, or other causes. These sheets are adhesively secured to the asbestos wall boards and are firmly secured thereto by a suitable adhesive in the manner substantially the same as wall paper is applied to a wall. The edges of the fabric are preferably laid in abutting relation. The sheets of fabric are preferably a tough cloth fabric such as tough muslin. An example of a suitable plastic material includes a mixture of flat paint with substantially equal parts of plaster of paris and whiting.

Enclosure or barrier containment of the asbestos structures involves building additional containing structures in front of or around the asbestos containing structures. For example, the asbestos is contained by erecting walls that are intended to be air tight so as to contain the asbestos that delaminates or is otherwise freed from the underlying structures. The containment walls are expensive to build and result in a loss of room space. The containment option also can require repositioning various fixtures, such as ceiling lights for example.

U.S. Pat. No. 3,185,297 to Rutledqe, a coinventor of the present invention, discloses a fabric impregnated with uncrystallized gypsum that is formulated so that when it is applied to a substrate with an adhesive, the adhesive causes the gypsum to crystallize and form a secure bond to the substrate. This patent is hereby incorporated herein by reference. U.S. Pat. Nos. 3,887,748 and 3,941,632 to Swedenbero et al, also including one of the coinventors of the present invention, are hereby incorporated herein by reference. The Swedenberq et al patents disclose a wall covering that includes a flexible lath of mesh material bonded to a substantially dry semi-hydrated flexible gypsum layer on one side thereof that is applied to a wall in the manner of wall paper. The walls to which the covering typically is applied include concrete block, concrete walls, cinder block walls, etc. The covering is applied by covering the rear surface of the lath with an aqueous latex adhesive in an amount which will transfer sufficient water from the adhesive to the gypsum to hydrate and set the gypsum and, at the same time, remove sufficient water from the adhesive to invert the latex and convert it to a viscous, tacky state, ideally suited to adhere the wall covering firmly to the substrate. An example of a suitable adhesive is a polyvinyl acetate water emulsion that typically consists of from 45 to 60% solids, the balance being water. The adhesive is applied to an exposed side of the gypsum layer.

In a 1987 technical bulletin published by Wall & Floor Treatments, Inc. of Liberty, S.C., the assignee of the present invention, instructions are provided for applying the Swedenberq et al product such that it should always be brought around outside corners. If inside corners are straight and true, it may also be brought around the corner being sure to force it into the corner to prevent spanning. A clear protective coating comprising polyvinyl butyral is applied by the factory to the surface of the product that will be exposed after attachment to the wall. A clear coating of protective acrylic sealant may be applied after the product has been put on the wall so as to produce a tough, clear low gloss finish that is highly resistant to most common stains, including graffiti.

OBJECTS AND SUMMARY OF THE INVENTION

It is a principal object of the present invention to provide a method for encapsulating and containing asbestos fibers in existing building structures.

It also is a principal object of the present invention to provide a method for eliminating the threat of airborne asbestos fibers in existing building structures such as walls, ceilings, pipes, conduits, ducts, insulating surface layers, and the like, comprising asbestos fibers as an integral part thereof.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of encapsulating and containing asbestos which forms an integral part of existing building structures comprises the step of applying an encapsulating coating comprising a water soluble polyvinyl acetate emulsion containing about 15 to 20% solids to the exterior surface of the structure and preferably at a coverage of about 65 to 75 square feet per gallon of the encapsulant fluid. The encapsulant is permitted to dry and penetrate into the structure to/encapsulate the asbestos fibers near the surface thereof. Preferably, the encapsulant should be permitted to dry undisturbed for about 24 hours after its application. It is believed that in this way the asbestos fibers are not disturbed before the encapsulant can penetrate the surface structure and encapsulate the asbestos fibers.

In further accordance with the present invention, a primer coating is applied to the structure surface. Preferably, the primer coating comprises polyvinyl acetate emulsion having about 35 to 45 percent solids.

For some applications, the primer coating of polyvinyl acetate with 35 to 45 percent solids emulsion need not be applied to the structure surface. This may be the case when the asbestos fibers are not easily dislodged from the structure surface and moisture in the environment is always low.

In still further accordance with the present invention, an adhesive coating is applied to the gypsum side of a sheet of a surface covering product comprising a substantially dry, semi-hydrated gypsum. An example of a suitable surface covering product includes those disclosed in the Swedenberg et al patents and sold under the trade name PLASTER IN A ROLL by Flexi-Wall Systems of P.O. Box 88, Liberty, S.C. 29657. Preferably, the adhesive coating comprises polyvinyl acetate emulsion having about 35 to 45 percent solids.

In yet further accordance with the present invention, the sheet of gypsum product is applied to the surface of the structure by contacting the structure surface prepared with the encapsulant and the primer coating, with the side of the gypsum product prepared with the adhesive coating. The application of the gypsum product to the prepared surface of the structure should occur before the two coatings (primer and adhesive) of the 35 to 45 percent solids emulsion have dried and while they remain tacky.

In further accordance with the present invention subsequent sheets of the gypsum product are applied to the structure surface so that the edge of each subsequent sheet overlaps the edge of the prior sheet of gypsum product by about 2 inches and forms an overlapped seam. The subsequent sheets are applied using the primer and adhesive coatings described above. Thus, the primer coating comprising the polyvinyl acetate emulsion having about 35 to 45 percent solids should cover about 2 inches of the edge of the adjacent, and previously applied sheet of gypsum product. In an alternative embodiment, an overlapping strip of the gypsum product is applied to cover and overlap the adjacent edges of two sheets of the gypsum product previously applied. Preferably, the overlapping strip should extend about two inches to each side of the seam formed by the adjacent edges of the underlying sheets of gypsum product.

Preferably, the overlapping of adjoining sheets of the gypsum product also occurs where the walls join a ceiling for example. Moreover, at such junctures, it is preferred to apply the primer coating of the polyvinyl acetate emulsion with 35 to 45 percent solids to the surface of the edge of the prior laid sheet of gypsum product.

In still further accordance with the present invention, a preliminary sealant coating is applied to the outer surface of the gypsum product. Preferably, polyvinyl butyral is used as the preliminary sealant coating and is applied for example with a roller. The PLASTER IN A ROLL product noted above has a suitable sealant coating of polyvinyl butyral applied at the factory.

In yet further accordance with the present invention, a vapor barrier coating comprising a waterbased acrylic emulsion having about 30 to 40 percent solids is applied to the polyvinyl butyral coated outer surface of the gypsum product. This vapor barrier coating is permitted to dry.

In still further accordance with the present invention, a final coating comprising the water-based acrylic emulsion having about 30 to 40 percent solids is applied over the vapor barrier coating and permitted to dry.

Preferably, the adhesive and primer coatings are allowed to dry thoroughly before applying the vapor barrier coating and the final coating.

The butyral coating and two coatings of acrylic emulsion combine to form a medium-grade vapor barrier. Such barrier provides the gypsum product with about a three (3) perm rating and allows vapor trapped between the structure surface and the final (outermost) coating to escape. However, the asbestos fibers are prevented from passing through the medium-grade vapor barrier formed by the vapor barrier coating and final coating comprising the water-based acrylic emulsion. The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Reference now will be made in detail to the present preferred embodiments of the present invention, several examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention cover the modifications and variations of this invention provided they come within the scope of the appended claims and their equivalents.

Figure 1:
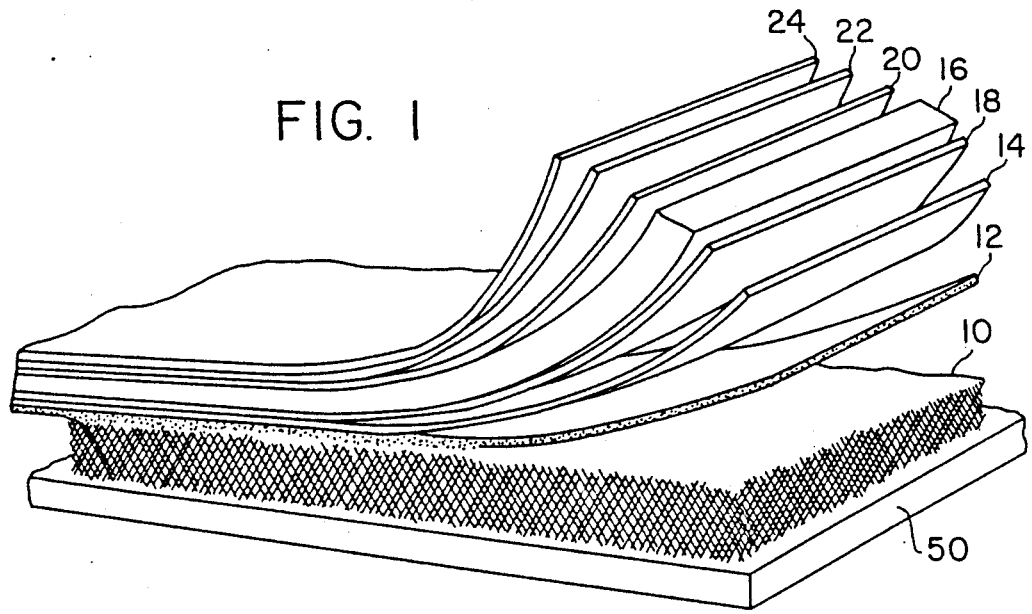
FIG. 1 schematically illustrates one embodiment of practice of the method of the present invention.

A preferred embodiment of the method of the present invention is shown schematically in FIG. 1.

Preferably, the method of the present invention is practiced on asbestos which is securely attached to the underlying substrate 50. For example, if a two inch thick layer of asbestos was applied to a building wall as insulation, the method of the present invention preferably would not be practiced if the insulation was breaking off of the wall in clumps. This is because such delamination would prevent the method of the present invention from forming a permanent barrier around the asbestos containing insulation structure. However, if the insulation were friable so that the asbestos fibers could be freed upon striking the insulation but were not delaminating without the application of such impacts, this surface likely would be deemed suitable by the licensed asbestos engineer for containment with the present invention. Thus, the licensed asbestos technician preferably determines that the asbestos is attached sufficiently securely to the building substrate 50 before undertaking practice of the method of the present invention.

According to the method of the present invention of encapsulating and containing asbestos fibers which form an integral part of existing building structures, an encapsulating coating is applied to the exterior surface of the asbestos-containing structure 10 which typically covers a building substrate 50. As embodied herein and shown schematically in FIG. 1, an encapsulating coating 12 preferably comprises a water soluble polyvinyl acetate emulsion containing about 15 to 20% solids and preferably is applied at a coverage rate of about 65 to 75 square feet of the structure surface per gallon of the emulsion. As embodied herein, the encapsulating coating preferably is applied as a fine mist by using a DE VILBISS (De Vilbiss 520 A Wharton Circle, S.W., Atlanta, GA 30336) air sprayer model MBC 510 having an air cap #704 and FX fluid tip and needle. The sprayer preferably applies the encapsulating coating at 60 psi from a two or five gallon pressure tank. The compressor should have at least a 7¼ horsepower motor, with a larger compressor if the distance from the compressor to the work exceeds 100 feet.

Examples of the composition of the encapsulating coating include one-half strength (approximately twice the water) of Examples I through Example VII as set forth in the Swedenberg et al patents, previously incorporated herein by reference and set forth below. The % solids refer to weight percentages.

| Example I | |
|---|---|
| Polyvinyl acetate water emulsion (45%–60% solids) | 30–95 parts |
| Plasticizer | 5–15 parts |
| Water | 0–40 parts |
| Example II | |
| Polyvinyl acetate water emulsion (45%–60% solids) | 30–95 parts |
| Solvent | 5–35 parts |
| Water | 0–50 parts |
| Example III | |
| Polyvinyl acetate water emulsion (45%–60% solids) | 30–95 parts |
| Plasticizer | 5–15 parts |
| Solvent | 0–35 parts |
| Water | 0–50 parts |
| Example IV | |
| Polyvinyl acetate water emulsion (45%–60% solids) | 30–95 parts |
| Tackifying resin | 1–20 parts |
| Water | 0–60 parts |
| Example V | |
| Polyvinyl acetate water emulsion (45%–60% solids) | 30–95 parts |
| Thickener | 1–20 parts |
| Water | 0–60 parts |
| Example VI | |
| Ethylene-vinyl acetate copolymer water emulsion (45%–60% solids) | 30–95 parts |
| Plasticizer | 5–15 parts |
| Water | 0–40 parts |
| Example VII | |
| Ethylene-vinyl acetate copolymer water emulsion (45–60% solids) | 30–95 parts |
| Tackifying resin | 1 to 20 parts |
| Water | 0 to 100 parts |

A preferred embodiment of the formulation of a polyvinyl acetate emulsion suitable for use as encapsulating coating 12 now will be described. Preparation of the formulation requires preparation of a premix of seventy-five pounds of a partially hydrolyzed grade of polyvinyl alcohol powder such as AIRVOL 540 brand available from Air Products & Chemicals, Inc. of Allentown, Pa. 18195, 2¼ pounds of a biocide such as a fungicide and/or an antimicrobial agent which kills mildew for example, and 1625 lbs of water. The polyvinyl alcohol powder is slowly added at a steady rate (to avoid lumping) with agitation into the 1625 pounds of water, which is at or below room temperature. After the powder is dispersed, the temperature is increased to about 180° Fahrenheit over a span of about two hours during which agitation continues. The premix is subjected to low shear mixing for an additional 30 minutes (or until dissolution of the powder is complete) at the 180° Fahrenheit temperature. A suitable biocide known as DOWICIL 75 is available from Dow Chemical U.S.A. of Midland, Mich. 48674. After the two hours of low shear mixing, the premix is allowed to set for about one week during which time any air that has been included during the mixing is released from the premix. The air removal eliminates the need to use a defoaming agent during subsequent processing. Then the deaerated premix is added to about 1500 pounds of a 55% solids polyvinyl acetate emulsion and about 36 pounds (4 gallons) of ethylene glycol. A suitable polyvinyl acetate emulsion is Airflex 400 brand, which is available from Air Products and Chemicals, Inc. of Allentown, Pa. 18195. Then this mixture is mixed in a 500 gallon tank for about 2 hours at room temperature. The mixing preferably is accomplished by using a low shear mixing propeller and a pump which circulates from the tank bottom to the top surface of the mixture. The result is about 350 gallons of a 15 to 20% solids polyvinyl acetate emulsion suitable for use as encapsulating coating 12. Preferably, during the winter months or in shipments to very cold climates, an additional four gallons (36 lbs) of ethylene glycol is added to the mixture. However, the ethylene glycol preferably should not exceed 4% by weight of the emulsion.

In further accordance with the present invention, the encapsulating coating comprising polyvinyl acetate emulsion containing about 15 to 20% solids that has been applied to the surface of the structure is permitted to dry without disturbance of the structure surface. During the drying stage, it is believed that the encapsulating coating penetrates the surface of the structure and encapsulates the asbestos fibers near the surface of the structure. Preferably, encapsulating coating 12 should be permitted to dry undisturbed for about 24 hours after its application in order to ensure that adequate penetration and encapsulation has occurred before the asbestos fibers are subject to being disturbed by the remaining steps of the method of the present invention.

In further accordance with the present invention, a primer coating 14 is applied to the structure surface 10 previously prepared with encapsulating coating 12. Preferably, primer coating 14 is a polyvinyl acetate emulsion having about 35 to 45% solids.

In still further accordance with the method of the present invention, an adhesive coating 18 is applied to the gypsum side of a sheet of a surface covering product. Adhesive coating 18 preferably comprises a polyvinyl acetate emulsion having 35 to 45% solids and is applied to the gypsum side of a sheet of surface covering product 16.

Preferably, the surface covering product is a substantially dry, semi-hydrated gypsum. An example of a suitable surface covering product includes those disclosed in the Swedenbero et al patents and sold under the trade name PLASTER IN A ROLL by Flexi-Wall Systems of P.O. Box 88, Liberty, S.C. 29657, the assignee of the present application.

Suitable formulations of the polyvinyl acetate emulsion formulation for primer coating 14 and adhesive coating 18 are those that are set forth at Columns 2 through 3 of the Swedenberq et al patents, which previously have been incorporated herein by reference. The preferred formulation is the same as the preferred formulation set forth above for the encapsulating coating 12 except that instead of 1625 pounds of water in the premix, only 370 pounds (45 gallons) of water are used. This reduction produces a commensurate reduction in the yield of from about 350 gallons to about 230 gallons.

In yet further accordance with the present invention, the sheet of gypsum product 16 is applied to cover the surface of the structure by contacting the two coatings, primer 14 and adhesive 18, of the polyvinyl acetate emulsion having about 35 to 45% solids. The side of gypsum product 16 coated with adhesive coating 18 is laid against primer coating 14, which covers structure 10. Primer coating 14 and adhesive coating 18 should be applied to each other before they have dried and while they are tacky.

Figure 2:
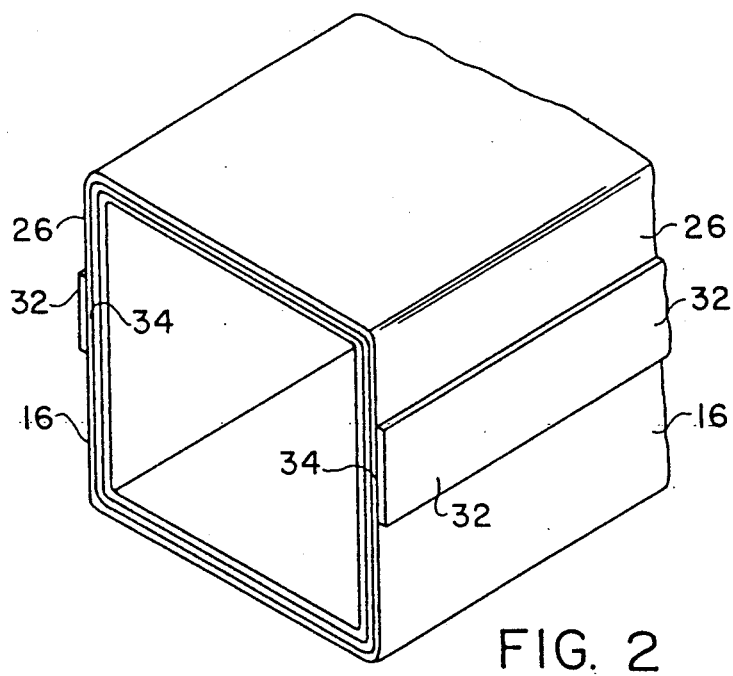
FIG. 2 illustrates a particular feature of the result of practicing the method of the present invention.
Figure 3:
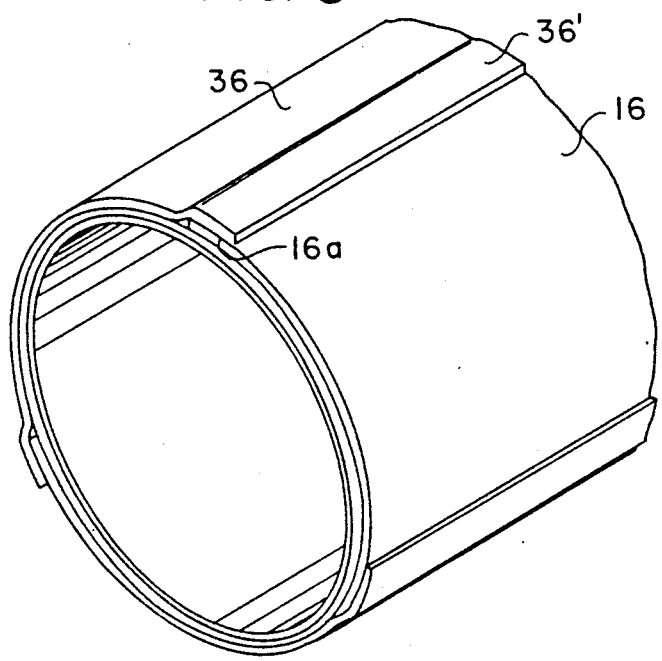
FIG. 3 illustrates a second particular feature resulting from practice of the method of the present invention.

In further accordance with the present invention, the seams formed by adjoining sheets of gypsum product should be covered. Preferably, subsequent sheets of gypsum product 16 are applied to the structure surface so that the edge of each subsequent sheet overlaps the edge of the prior sheet of gypsum product by about two inches and forms an overlapped seam. As embodied herein and shown in FIGS. 3 and 4 for example, a first sheet 16 of gypsum product is overlapped by a subsequent sheet 36 (FIG. 3), 46 (FIG. 4), of the gypsum product. The respective edge section 36', 46', and 56', of each respective subsequent sheet 36, 46, and 56, overlaps the edge 16a, 46a of the prior sheet 16, 46 of gypsum product by about two inches and forms the overlapped seam. In an alternative embodiment shown in FIG. 2 for example, a strip 32 of the gypsum product is applied to cover and overlap the adjacent edges of two sheets 16, 26 of the gypsum product previously applied. Preferably, the strip should extend about two inches to each side of the seam 34 formed by the adjacent edges of the underlying sheets of gypsum product. Though not shown in FIGS. 2–4 in order to avoid unduly cluttering the drawings, the primer coating (denoted by the numeral 14 in FIG. 1) of the polyvinyl acetate emulsion having about 35 to 45% solids should cover about two inches of the edge section of the adjacent and previously applied sheets 16, 26 (FIGS. 2–4), 46 (FIG. 4) of gypsum product.

Figure 4:
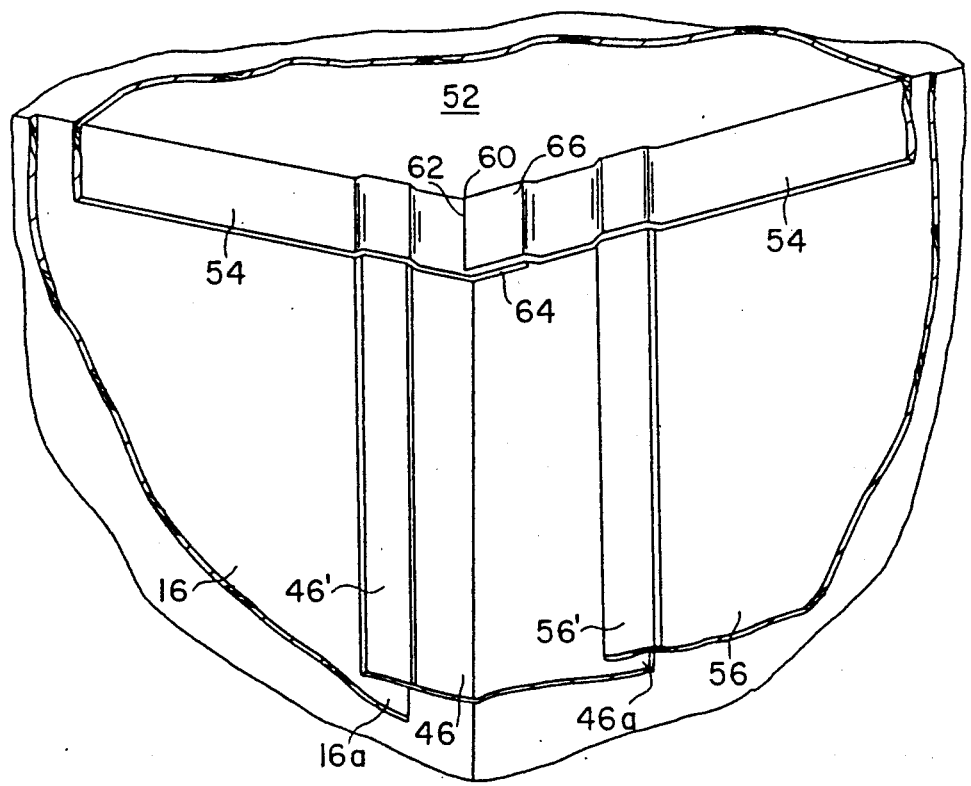
FIG. 4 illustrates a third particular feature resulting from practice of the method of the present invention and shows a view of a ceiling-wall corner from the perspective of the floor level looking up at the ceiling-wall corner.

Preferably, as shown in FIG. 4, the overlapping of adjoining sheets of the gypsum product occurs near corners and where the walls join a ceiling for example. At such junctures, it is preferred to apply the primer coating 14 to the surface of the edge of the underlying (prior laid) sheet of gypsum product. An overlapping portion 54 of a sheet 52 applied to the ceiling extends over the edge of the sheets 16, 46, 56 which cover the walls of a room. Overlapping portion 54 extends about two inches over the edge of the underlying edges of sheets 16, 46, and 56. In the corner 60, a straight cut 62 is made along one edge of sheet 52 to provide a flap 64 which extends beneath and is covered by the overlying portion 66 of overlapping portion 54 of sheet 52. In an alternative embodiment (not shown), a corner 60 can be formed by cutting the corner of a sheet at a 45° angle overlapping the 45 degreed angled wedges to form a corner.

In further accordance with the present invention, a preliminary sealant coating 20 is applied to the outer surface of the gypsum product 16. As embodied herein and shown in FIG. 1 for example, a preliminary sealant coating 20 is applied to the surface of gypsum product 16 facing opposite the surface of gypsum product 16 coated with adhesive coating 18. Sealant coating 20 preferably comprises polyvinyl butyral. A polyvinyl butyral coating is applied at the factory to the PLASTER IN A ROLL product noted above, and the factory applied coating of polyvinyl butyral suffices for purposes of this invention.

The PLASTER IN A ROLL product noted above provides a preferred gypsum product for practicing the method of the present invention and has numerous advantages for this purpose. For example, the product has excellent resistance to abrasion, is non-toxic, has an excellent fire proof rating, produces no toxic fumes in the event of fire, hardens to produce an impact resistant surface, and "breathes" to prevent moisture build up that might result in delamination or degradation of the asbestos.

In yet further accordance with the present invention, a vapor barrier coating is applied to the polyvinyl butyral coated outer surface of the gypsum product. As embodied herein and shown in FIG. 1 for example, a vapor barrier coating 22 comprising a water-based acrylic emulsion having about 30 to 40% solids is applied to the polyvinyl butyral outer coating 20 that previously has been applied to the outer surface of gypsum product 16. This vapor barrier coating 22 preferably is permitted to dry before the next step in the method of the present invention. About two hours of drying time are sufficient under normal atmospheric and humidity conditions.

A yet further step in accordance with the method of the present invention involves applying a final coating 24 over vapor barrier coating 22 and permitting final coating 24 to dry. Final coating 24 preferably comprises a water-based acrylic emulsion having about 30 to 40% solids. Typically, the vapor barrier coating 22 and final coating 24 are of the same emulsion.

A preferred embodiment of a water-based acrylic emulsion having about 30 to 40% solids for use as both vapor barrier coating 22 and final coating 24 includes about 1350 pounds of an acrylic copolymer emulsion, about 24 pounds of a surfactant, about 65 pounds of tri aryl phosphate, about 135 pounds of diethylene glycol monoethyl ether, and about 7 pounds of ethylene glycol. A suitable acrylic copolymer emulsion is available from ICI Resins US of Wilmington, Mass. under the trade name NEO CRYL SR-270. A suitable surfactant is a 70% surfactant including octylphenoxy polyethoxyethanol known as TRITON X-405 available from Chemcentral Atlanta, Daraville, Ga. Tri aryl phosphate, a plasticizer, is available from FMC Corp. of Nitro, W.V. under the trade name KRONITEX 100. Diethylene glycol monoethyl ether, a coalescent, is available from Ashland Chemical Company of Columbus, Oh. under the trade name GLYCOL ETHER DE-LG. Ethylene glycol, an anti-freeze which increases the number of times the product can be frozen and thawed, is available from Celanese Chemical Company of Dallas, TX.

Each of primer coating 14, adhesive coating 18, vapor coating 22 and final coating 24 is preferably applied using a roller or brush.

The combination of the butyral coating and the two coatings (vapor barrier coating 22 and final coating 24) of acrylic emulsion combine to form a medium-grade vapor barrier. This barrier has a rating of about 3 perms as compared to a 40 perm rating of the PLASTER IN A ROLL product delivered from the factory with the polyvinyl butyral coating. The 3 perm vapor barrier allows any vapor which forms between the structure surface and final coating 24, which is outermost, to escape. However, the asbestos fibers are prevented from passing through such medium-grade vapor barrier formed by at least vapor barrier coating 22 and final coating 24 of the water-based acrylic emulsion. If water vapor cannot escape from the structure surface, it can cause delamination of the asbestos 10 from structure surface 50, degradation of the asbestos, and resulting failure of the containment of the asbestos fibers.

Preferably, the gypsum product and in particular the primer and adhesive coatings, are allowed to dry thoroughly before applying vapor barrier coating 22 and final coating 24.

What is claimed is:

1. A method of encapsulating and forming a containment barrier for asbestos fiber which forms an integral part of existing building structures, the method comprising the steps of:
   (a) applying an encapsulant coating to the exterior surface of the building structure, said exterior surface comprising asbestos fibers;
   (b) allowing the encapsulant coating to dry;
   (c) applying a primer coating to the structure surface to which the encapsulant coating has been applied;
   (d) applying an adhesive coating to the gypsum side of a sheet of a surface covering product comprising a substantially dry, semi-hydrated gypsum;
   (e) applying the sheet of gypsum product to the surface forming the primer coating by contacting said primer coating surface with the side of the gypsum product prepared with said adhesive coating;
   (f) applying subsequent sheets of the gypsum product to the primer coating surface so as to overlap by about two inches the edge of the prior sheet of gypsum product previously applied to the primer coating surface;
   (g) allowing the water to thoroughly dry from the primer coating and adhesive coating;
   (h) providing a preliminary sealant coating to the outer surface of the gypsum product;
   (i) applying a vapor barrier coating to the sealant coating on the outer surface of the gypsum product; and
   (j) applying a final coating to the vapor barrier coating.

2. A method as in claim 1, wherein:
   each of said primer coating and adhesive coating comprise a polyvinyl acetate emulsion having about 35 to 45% solids and includes a latex plasticizer.

3. A method as in claim 2, wherein:
   said polyvinyl acetate emulsion having about 35 to 45% solids includes a latex solvent.

4. A method as in claim 1, wherein:
   each of said primer coating and adhesive coating comprises a polyvinyl acetate emulsion having about 35 to 45% solids and includes a tackifying resin.

5. A method as in claim 1, wherein:
   each of said primer coating and adhesive coating comprises a polyvinyl acetate emulsion having about 35 to 45% solids and includes a thickener.

6. A method as in claim 1, wherein:
   each of said primer coating and adhesive coating comprises a polyvinyl acetate emulsion having about 35 to 45% solids and includes a biocide.

7. A method as in claim 1, wherein:
   each of said primer coating and adhesive coating comprises a polyvinyl acetate emulsion having about 35 to 45% solids and includes ethylene glycol.

8. A method as in claim 1, wherein:
   instead of applying subsequent sheets of the gypsum product so as to overlap by about two inches the edge of the prior sheet of gypsum product previously applied to the primer coating surface, the edge of each subsequent sheet is applied against the adjoining edge of the prior sheet to form a seam, and about a 4" wide strip of gypsum product is applied over the seam after applying a primer coating over the seam and an adhesive coating to the side of the strip to be placed against the primer coating.

9. A method of encapsulating and forming a containment barrier for asbestos fiber which forms an integral part of existing building structures, the method comprising the steps of:
   (a) applying an encapsulant coating comprising a water soluble polyvinyl acetate emulsion containing about 15 to 20 solids to the exterior surface of the building structure, said exterior surface comprising asbestos fibers, wherein the coverage of the encapsulant coating is about 65 to 75 square feet per gallon;
   (b) allowing the encapsulant coating to dry;
   (c) applying a primer coating comprising polyvinyl acetate emulsion having about 35 to 45% solids to the structure surface to which the encapsulant coating has been applied;
   (d) applying an adhesive coating comprising the polyvinyl acetate emulsion having about 35 to 45% solids to the gypsum side of a first sheet of a surface covering product comprising a substantially dry, semi-hydrated gypsum;
   (e) applying the first sheet of gypsum product to the primer coating surface by contacting said primer coating surface with the side of the gypsum product prepared with said adhesive coating;
   (f) applying subsequent sheets of the gypsum product to the primer coating surface so as to overlap by about two inches the edge of the prior sheet of gypsum product previously applied to the primer coating surface;
   (g) allowing the water to dry from the primer coating and adhesive coating;
   (h) providing a preliminary sealant coating comprising polyvinyl butyral to the outer surface of the gypsum product;
   (i) applying a vapor barrier coating comprising a water-based acrylic emulsion having 30 to 40% solids to be sealant coating on the outer surface of the gypsum product; and
   (j) applying a final coating comprising a water-based acrylic emulsion having 30 to 40% solids to the vapor barrier coating on the gypsum product to provide a medium-grade vapor barrier which allows trapped vapor to escape while preventing asbestos fibers from passing therethrough.

10. A method as in claim 9, wherein:
said polyvinyl acetate emulsion having about 35 to 45% solids includes a latex plasticizer.

11. A method as in claim 9, wherein:
said polyvinyl acetate emulsion having about 35 to 45% solids includes a latex solvent.

12. A method as in claim 9, wherein:
said polyvinyl acetate emulsion having about 35 to 45% solids includes a tackifying resin.

13. A method as in claim 9, wherein:
said polyvinyl acetate emulsion having about 35 to 45% solids includes a thickener.

14. A method as in claim 9, wherein:
each of said primer coating and adhesive coating includes a biocide.

15. A method as in claim 9, wherein:
each of said primer coating and adhesive coating includes ethylene glycol.

16. A method of encapsulating and forming a containment barrier for asbestos fiber which forms an integral part of existing building structures, the method comprising the steps of:
   (a) applying an encapsulating coating comprising a water soluble polyvinyl acetate emulsion containing about 15 to 20% solids to the exterior surface of the building structure, said exterior surface comprising asbestos fibers, wherein the coverage of the encapsulant coating about 65 to 75 square feet per gallon;
   (b) allowing the encapsulating coating to dry;
   (c) applying a primer coating comprising polyvinyl acetate emulsion having about 35 to 45% solids to the structure surface to which the encapsulant coating has been applied;
   (d) applying an adhesive coating comprising polyvinyl acetate emulsion having about 35 to 45% solids to the gypsum side of a sheet of a surface covering product comprising a substantially dry, semi-hydrated gypsum;
   (e) applying the first sheet of gypsum product to the primer coating surface by contacting said primer coating surface with the side of the gypsum product prepared with said adhesive coating;
   (f) applying a primer coating comprising a polyvinyl acetate emulsion having about 35 to 45% solids to any portion of the encapsulant coating surface lacking said primer coating and to about a two inch wide portion along the edge of the outer surface of the prior sheet of gypsum product previously applied to cover the building structure surface;
   (g) applying an adhesive coating comprising polyvinyl acetate emulsion having about 35 to 45% solids to the gypsum side of a second sheet of said gypsum product;
   (h) applying the second sheet of gypsum product to the surface of the structure by contacting the primer coating previously applied to the structure surface, with the side of the second sheet of the gypsum product prepared with the adhesive coating so as to overlap the edge section of the first sheet of gypsum product by about two inches of the edge section of the second sheet of gypsum product;
   (i) allowing the water to dry from the primer coatings and adhesive coatings;
   (j) providing a preliminary sealant coating comprising polyvinyl butyral to the outer surface of the gypsum product;
   (k) applying a vapor barrier coating comprising a water-based acrylic emulsion having 30 to 40% solids to the sealant coated surface of the gypsum product; and
   (l) applying a final coating comprising a water-based acrylic emulsion having 30 to 40% solids to the vapor barrier coating on the gypsum product to provide a medium-grade vapor barrier which allows trapped vapor to escape while preventing asbestos fibers from passing therethrough.

17. A method as in claim 16, further comprising:
allowing said vapor barrier coating to dry for about two hours before applying said final coating.

18. A method as in claim 1, wherein:
said encapsulant coating is allowed to dry undisturbed for about 24 hours after its application.

19. A method as in claim 1, wherein:
said encapsulant coating is applied by spraying.

20. A method as in claim 19, wherein:
said spraying is by a fine mist of encapsulant coating.

* * * * *